Figure 8:
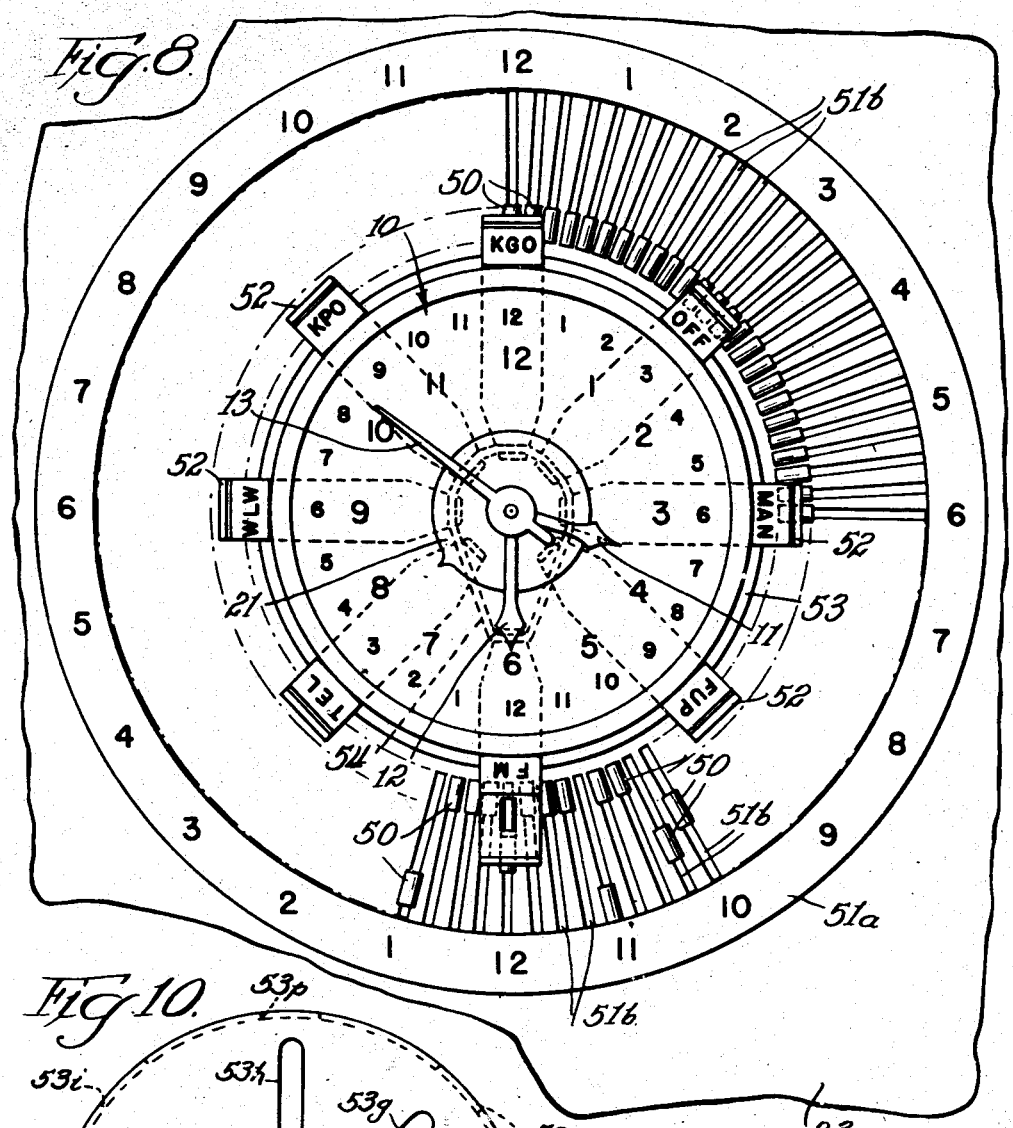

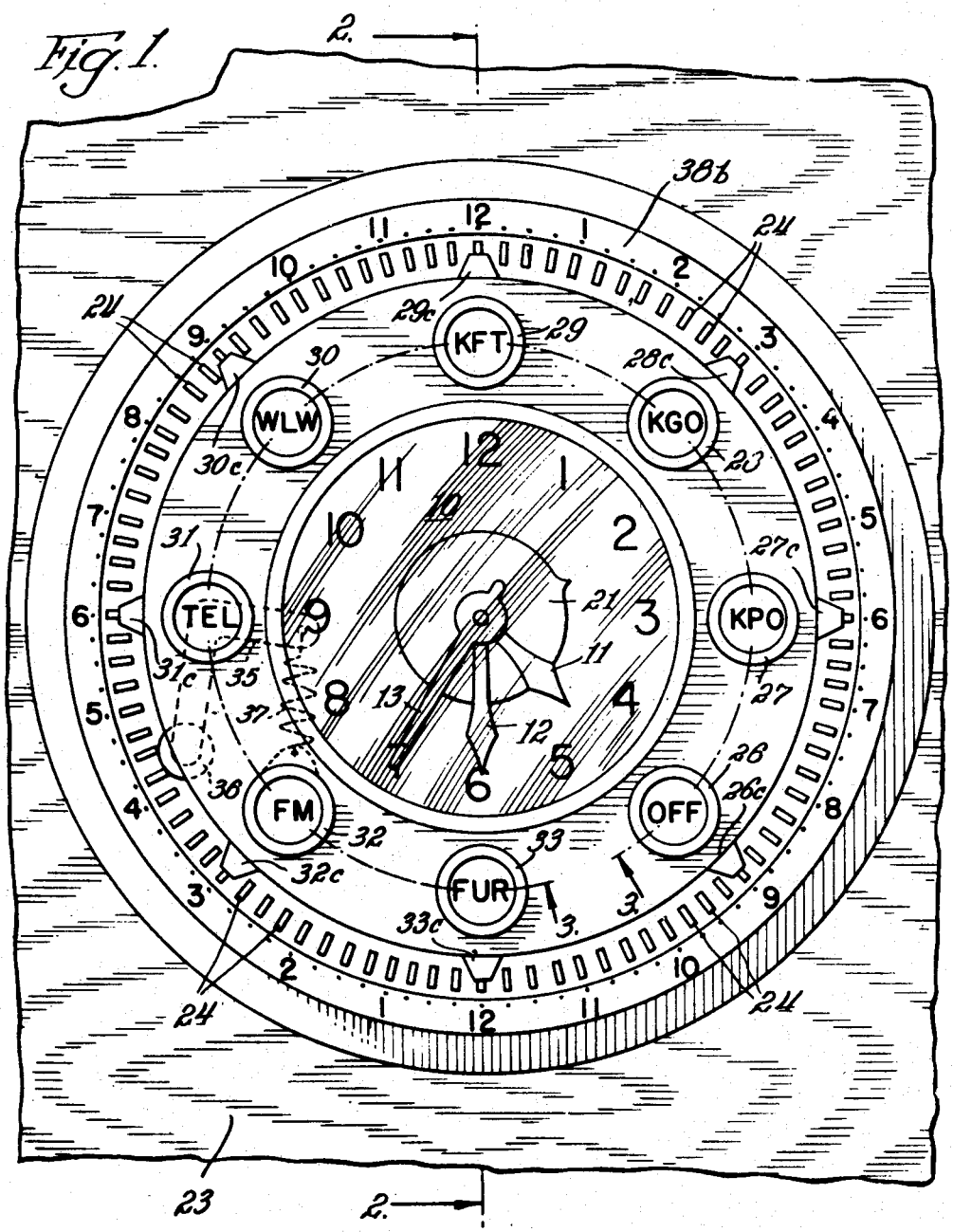

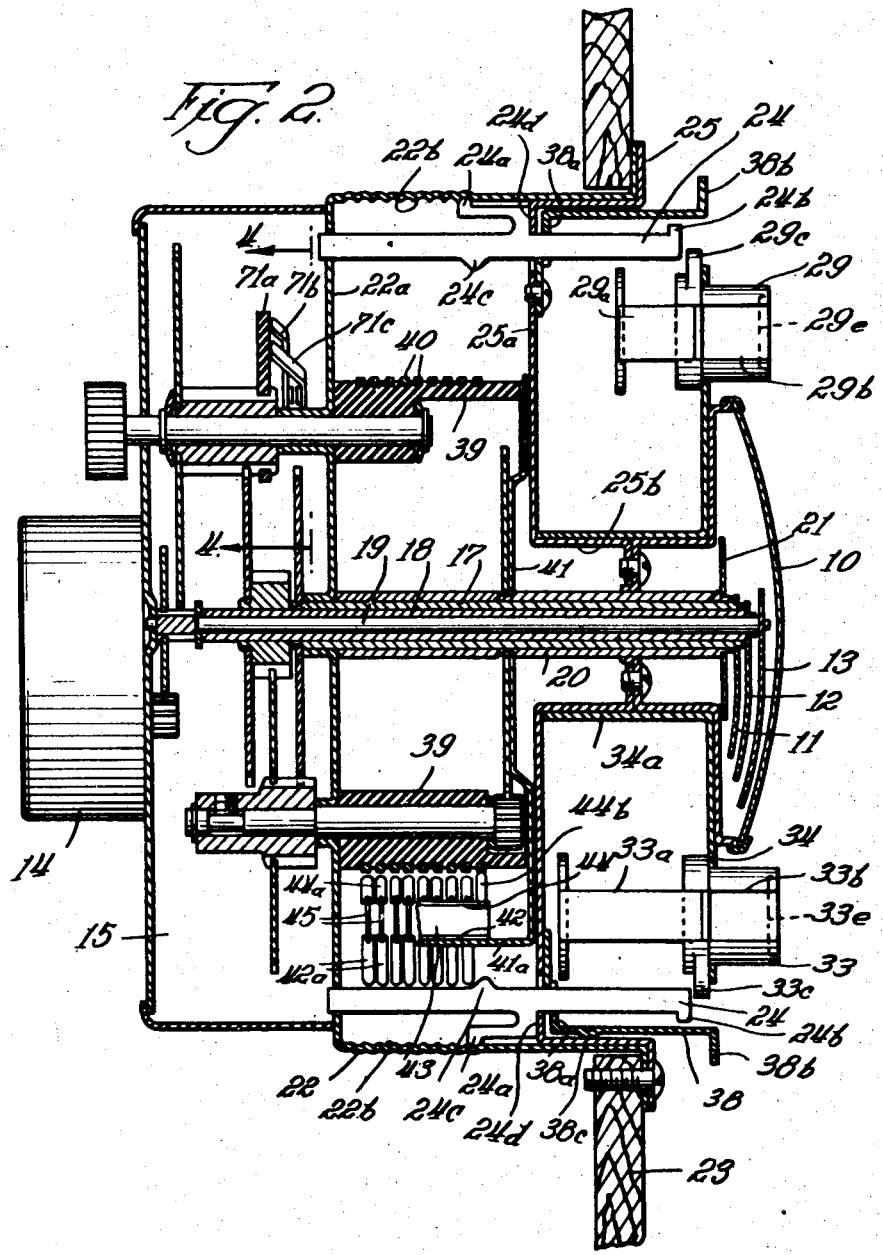

Nov. 5, 1946.   H. F. ELLIOTT   2,410,724
PROGRAM-SCHEDULING APPARATUS
Filed May 18, 1945   8 Sheets-Sheet 3
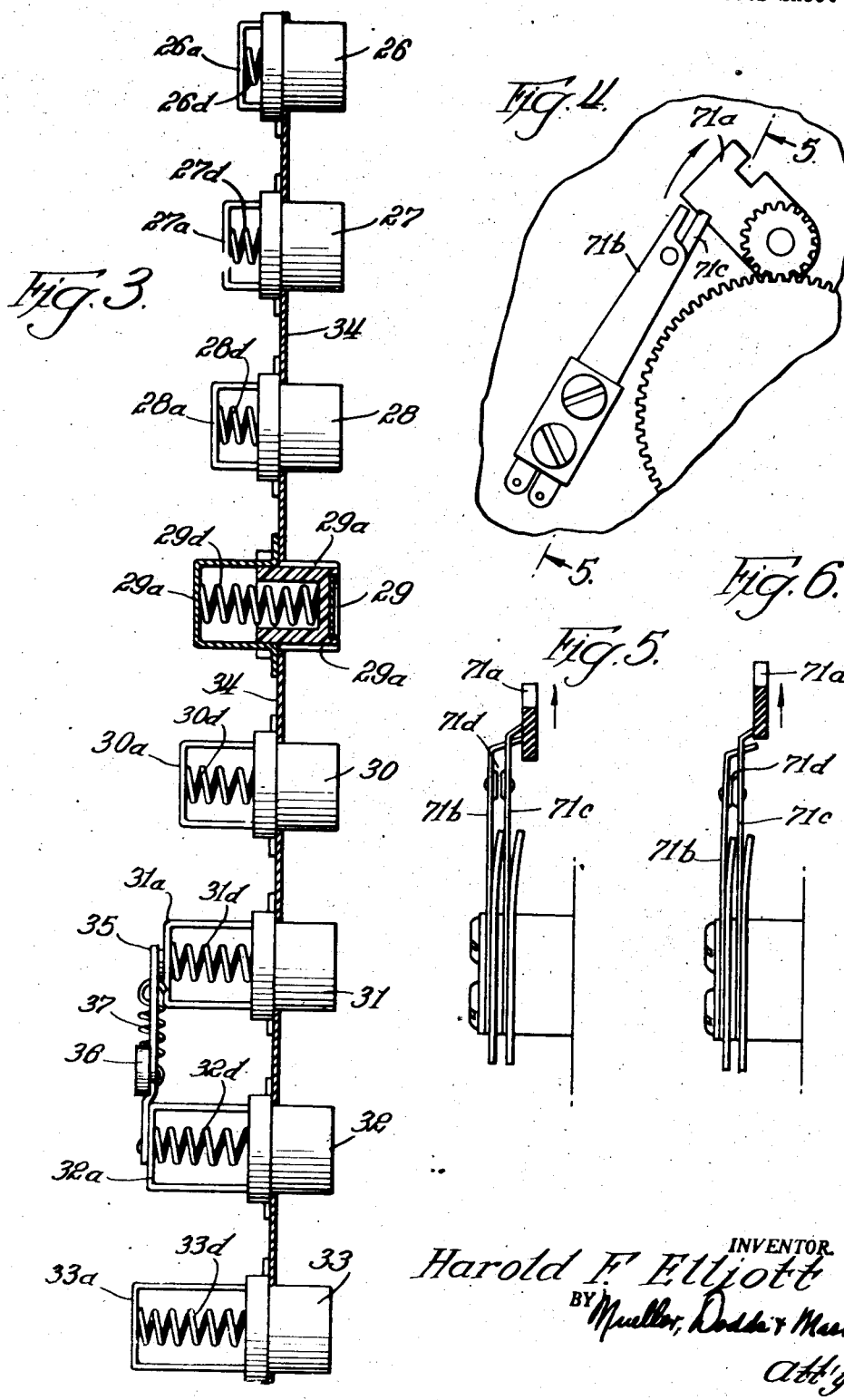

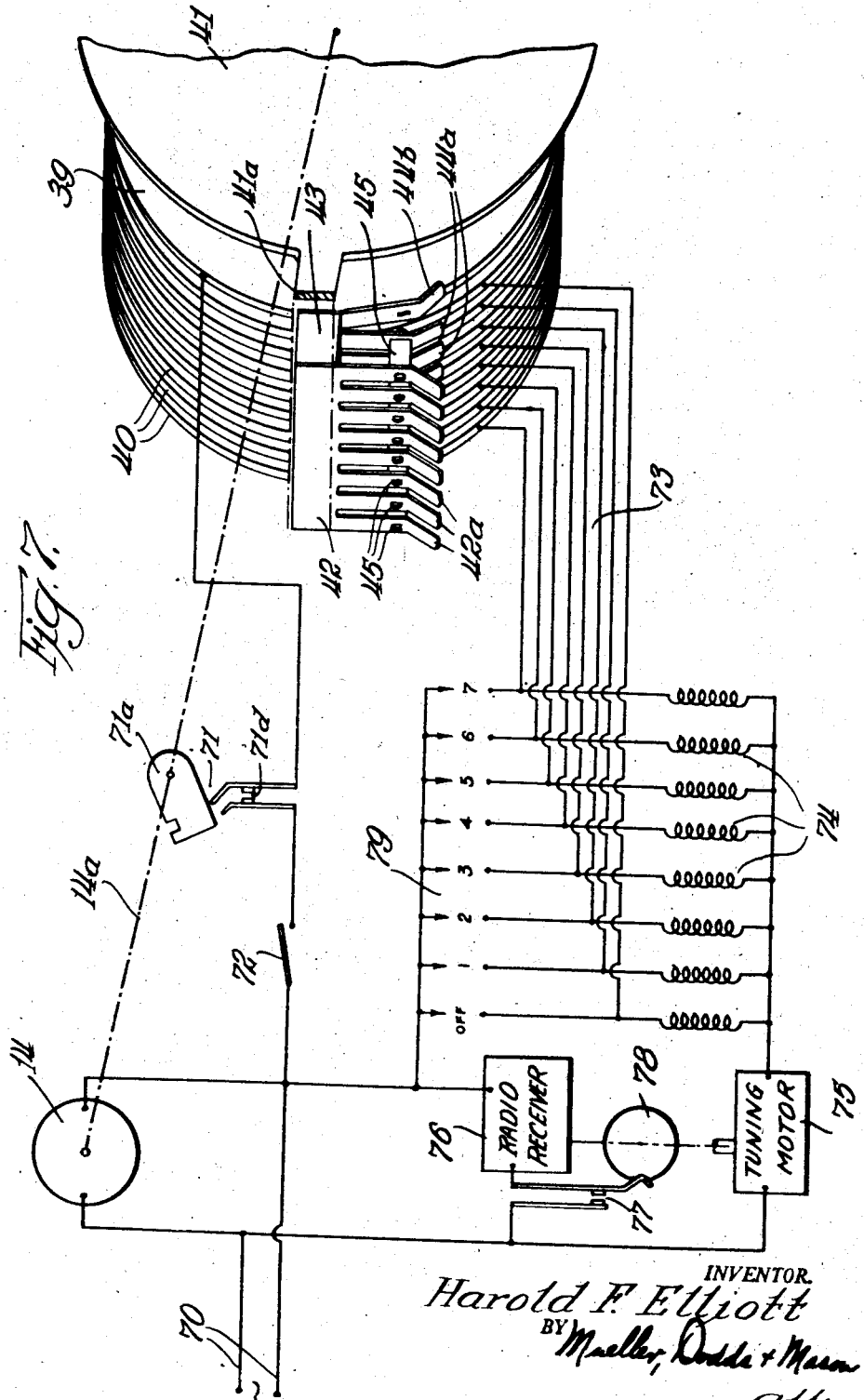

Nov. 5, 1946.    H. F. ELLIOTT    2,410,724
PROGRAM-SCHEDULING APPARATUS
Filed May 18, 1945    8 Sheets—Sheet 5

INVENTOR.
Harold F. Elliott
BY Mueller, Dodds & Mason
Att'ys.

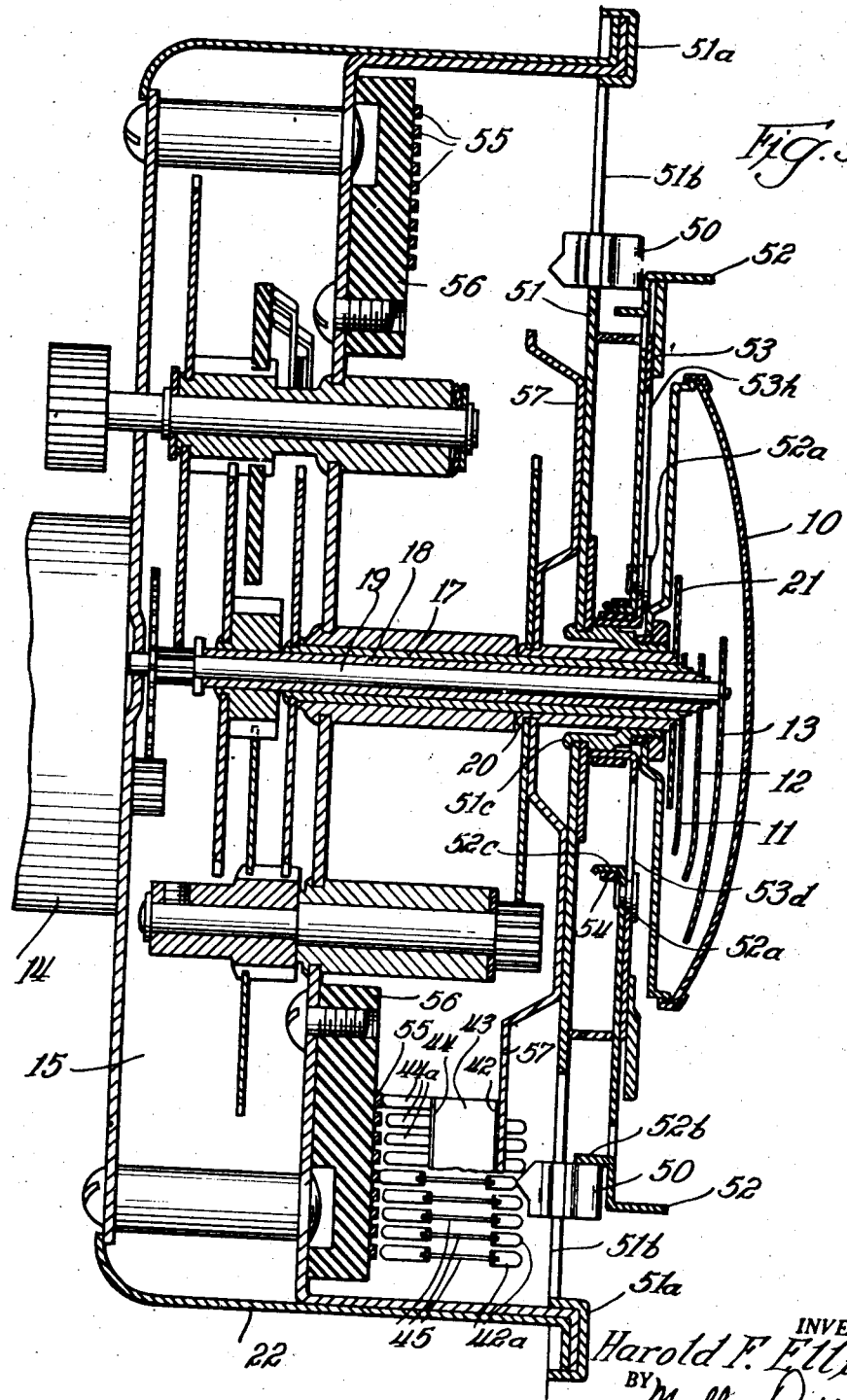

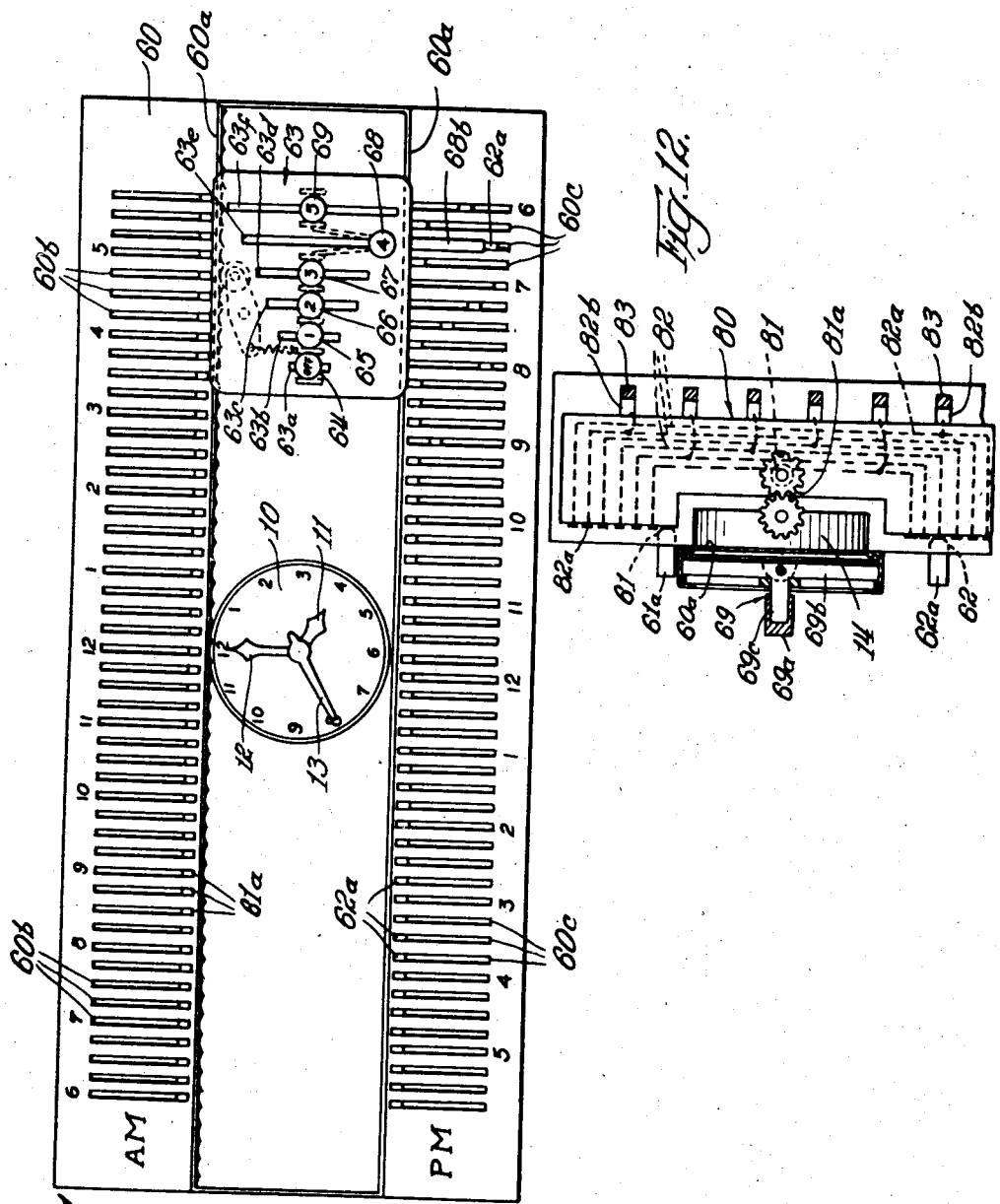

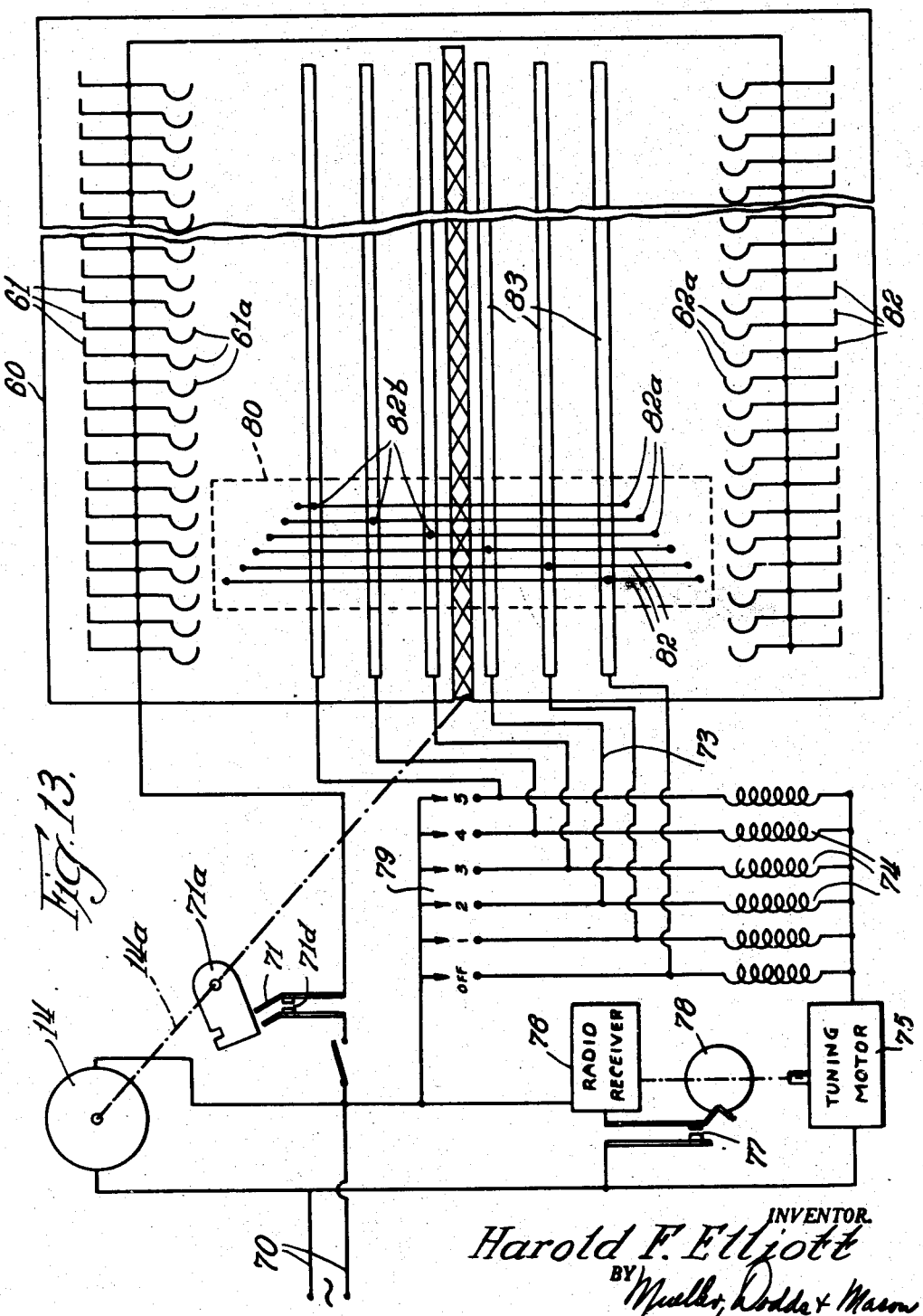

Patented Nov. 5, 1946

2,410,724

UNITED STATES PATENT OFFICE 2,410,724

PROGRAM-SCHEDULING APPARATUS

Harold F. Elliott, Belmont, Mass.

Application May 18, 1945, Serial No. 594,569

16 Claims. (Cl. 161—1)

1

This invention relates to program-scheduling apparatus and, while it is of general application, it is particularly suitable for embodiment in apparatus for determining the tuning of a radio-broadcast receiver at 15-minute intervals over a 24-hour period.

Heretofore there have been devised numerous so-called "clock controlled" tuners for radio-broadcast receivers. These have generally provided for determining the tuning of the receiver at 15-minute intervals over a 24-hour period. In certain of such prior art devices, there have been provided separate settable control elements, either mechanical or electrical, for each of the periods and each of the functions or stations to be controlled. Since there are ninety-six 15-minute intervals in a day, if six different functional controls are desired, that is if it is desired to be able to control the tuning to six different broadcasting stations, the apparatus has required a number of control elements equal to the product of these two numbers, that is 576. Such an arrangement is inherently complicated and difficult to encompass in an apparatus of reasonable size and it is also difficult to construct in a form which is convenient to set up from the front of the apparatus.

There has also heretofore been proposed a program-scheduling apparatus in which there is provided a single settable control element having at least two freedoms of motion so as to be able to interconnect any desired timing elements and any desired function-determining elements. While such an apparatus is very flexible and simple in construction, when applied to certain installations it requires a quite careful and critical adjustment on the part of the operator, which it is desirable to avoid.

It is an object of the invention, therefore, to provide a new and improved program-scheduling apparatus which is effective to obviate one or more of the above-mentioned disadvantages and limitations of such apparatus of the prior art.

It is another object of the invention to provide a new and improved program-scheduling apparatus which is effective to avoid the large number of settable control elements required in certain of the prior art apparatus, while at the same time facilitating the quick and accurate setting up of any desired time-function schedule.

In accordance with the invention, a program apparatus for setting up a predetermined schedule of a plurality of functions within a given time period comprises a group of settable members, means for movably supporting such members,

2 and a group of member-setting devices. One of such groups corresponds in number to the number of time intervals in the total time period and the other group corresponds in number to the number of functions being controlled. The apparatus also includes means for supporting the member-setting devices for movement to set a member in registry therewith, the two supporting means being relatively movable to bring each device into registry with any of such members to set the same. Each of the member-setting devices has a different characteristic movement for moving a registering member a different amount and the apparatus includes further means responsive to the position of said members for determining the desired function-time intervals.

For a better understanding of the invention, together with other and further objects thereof, reference is had to the following description taken in connection with the accompanying drawings while its scope will be pointed out in the appended claims.

Figure 10:
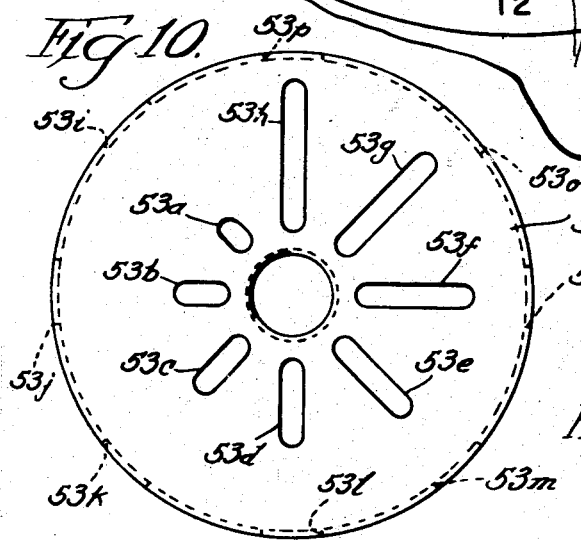

Referring now to the drawings, Fig. 1 is a front elevation and Fig. 2 is a longitudinal sectional view of a program-scheduling apparatus embodying the invention; Fig. 3 is a development of the slider-setting devices of the apparatus of Figs. 1 and 2; Figs. 4, 5 and 6 are detailed views of a timing switch embodied in the apparatus of Figs. 1 and 2; Fig. 7 is a schematic diagram of a circuit suitable for use with the apparatus of Figs. 1 and 2; Fig. 8 is a front elevation and Fig. 9 a longitudinal sectional view of a modified form of program - scheduling apparatus in which the slider-members are movable radially instead of axially; Fig. 10 is a front elevation of a supporting plate for the setting devices of the apparatus of Figs. 9 and 10; Fig. 11 is a front elevation and Fig. 12 a cross-sectional view of a modified form of program-scheduling apparatus in which the supporting frame for the setting devices is movable transversely of the slider members, which are disposed parallel to one another in a planar arrangement; Fig. 13 is a schematic circuit diagram of a circuit suitable for use in the apparatus of Figs. 11 and 12.

Referring now to Figs. 1, 2 and 3 of the drawings, there is illustrated a program apparatus for setting up a predetermined schedule of a plurality of functions within a given time period. This apparatus is built around an electric clock which may be of the conventional synchronous type having a face 10 and hour, minute and second hands 11, 12 and 13, respectively, driven from a motor 14 through conventional gearing, represented by the gear box 15, and the coaxial shafts 17, 18 and 19 connected to the appropriate gears within the gear box 15 and rotating at speeds of $\frac{1}{24}$, 1 and 60 revolutions per hour, respectively. Connected to a 24-hour shaft 20 is a day-night indicator 21. The clock mechanism is housed within a cylindrical casing 22 and is adapted to be mounted within a circular opening in a supporting panel 23. The clock mechanism described is conventional and forms no part of the present invention but is described for the purpose of illustrating the correlation of the program-scheduling apparatus of the invention with a conventional clock mechanism.

The apparatus of the invention includes a group of elongated settable members or sliders 24 equally spaced along an arcuate or circular path surrounding the face 10 of the clock mechanism. In order to provide control at 15-minute intervals over a 24-hour day, the group of sliders comprises ninety-six members, as illustrated in Fig. 1. The apparatus also includes means for movably supporting the slider members 24, for example an annular frame having the group of slider members 24 mounted therein and including a generally cup-shaped member 25 telescopically disposed within the cup-shaped frame member 22 and comprising plate-like closure members 22a and 25a having two series of aligned circumferentially spaced apertures in which the slider members 24 are disposed for longitudinal movement thereof. The sliders 24 are thus arranged in an array in the form of a substantially cylindrical cage. Each of the slider members 24 includes provisions for retaining it in any position in which it is set; for example, it may be provided with an axially extending resilient arm 24a frictionally engaging the inner surface of the cup-shaped frame member 22. If desired, the inner surface of the frame member 22 may be formed with a series of annular shallow grooves 22b which serve as indexing notches for the sliders 24.

The program-scheduling apparatus of the invention also includes a group of manually operable members or slider-setting devices arranged along an arcuate path, specifically a circular path coaxial with the circularly arranged slider members 24. For example, these slider-setting devices may be in the form of a group of push-buttons 26-33 inc. The push-buttons 26-33, inc., are reciprocable within the U-shaped straps or stirrups 26a-33a, respectively, supported from frame 34 and are provided with longitudinal slots, such as the slots 29b and 33b, engaging the supporting stirrups. The push-buttons 26-33, inc., also include radially projecting portions 26c-33c, inc., respectively, disposed to engage any one of the sliders 24 in registry therewith. The apparatus also includes means for normally biasing the push-button devices 26-33, inc., out of engagement with the sliders 24, this means being in the form of compression springs 26d-33d, inc., interposed between the supporting stirrups 26a-33a, inc., and the respective push-buttons.

The apparatus also includes means for establishing an operative connection between each of the push-button devices and any of the slider members to set the same. This means may include means for supporting the push-button devices for movement relative to the slider members to set a slider member in registry with a selected push-button device. This supporting means is in the form of a second annular disc or frame member 34 having an axially extending cylindrical sleeve or hub 34a rotatably supported on a hub portion 25b of the frame 25. That is, the frame 34 having the setting devices 26-33, inc., mounted thereon is coaxial with the frame comprising the plates 22a and 25a supporting the slider members 24, while the frame supporting the slider members 24 and that supporting the setting devices 26-33, inc., are relatively movable, that is relatively rotatable to bring each of the devices 26-33, inc., into registry with any one of the slider members 24 to set the same.

One of the groups described, for example the timing-sliders 24, corresponds in number to the number of time-intervals in the timing period, while the other of the groups, for example the group of slider-setting devices 26-33, inc., corresponds in number to the number of functions or stations to be controlled. As illustrated in Fig. 1, the devices 26-33, inc., may be inscribed with a legend indicating the function to be controlled, in this case indicating the particular broadcasting station to which the associated tuner is to be tuned or, in the case of push-button 26 with the legend "Off" as the function of this device is to turn-off the energization of the apparatus.

Each of the slider-setting devices 26-33, inc., has a different characteristic movement, for example a different extent of linear movement, for moving by a different amount a slider 24 having an operative connection or registering with a selected setting device. For example, the bases of the supporting stirrups 26a-33a, inc., comprise stop means cooperating with the respective push-buttons 26-33, inc., to limit the movements thereof to different amounts. This is represented most clearly in Fig. 3, which is a development of the push-button slider-setting devices per se. Thus it is seen that the lengths of the stirrups increase progressively from the stirrup 26a to the stirrup 33a so that the push-buttons 26-33, inc., are effective to adjust any slider in registry therewith by progressively increasing amounts but that each push-button is effective to move all the sliders by exactly the same amount.

Pivotally mounted on the base of one of the stirrups, for example the stirrup 31a, is a bell crank lever 35 having at one end thereof a roller 36 biased into engagement with the inner edges of the slider members 24 by means of a tension spring 37 engaging the other arm thereof. By proper proportioning of the bell crank 35 and the roller 36, the cooperating sliders 24 serve as a click-and-detent or indexing mechanism to insure positioning of the frame 34 with one of the projecting portions 26c-33c, inc., always in registry with one of the sliders 24.

Surrounding the sliders 24 is an annular ring 38 having at its inner end a radially inwardly projecting flange 38a and at its outer end a radially outwardly projecting flange 38b and one or more deformed portions 38c for frictionally engaging the inner surface of the frame member 25 to retain the ring 38 in any position to which it is set. The inner flange 38a is disposed to engage outwardly projecting lugs 24b on the slider members 24, while the outer flange 38b is adapted to be gripped by the operator and, when extended outwardly, is effective to cancel the settings of all of the slider members 24; that is to move them all outwardly to their extreme right-hand positions, as shown in Fig. 2, so that a new program schedule may be set up on the apparatus. The outward movement of the slider members 24 is limited by the engagement of their shoulders 24d with the back of frame member 25a. The flange 38b may also carry a 24-hour scale, as illustrated in Fig. 1, for use in selecting and setting the sliders 24 and for cooperating with the 24-hour indicator plate 21 to indicate whether the apparatus is operating within the day or night period.

The program-scheduling apparatus of the invention also includes means responsive to the positions of the slider members 24 for determining the desired function-time intervals to be established, this means being in the form of a timing mechanism operated by the clock and movable to engage the sliders 24 in succession and responsive to the respective positions thereof. Specifically, this timing mechanism comprises a stationary cylindrical member 39 of insulation material supported from the end plate 22a of the frame 22 and having mounted thereon a plurality of conductive electrical slip-rings 40, one greater in number than the number of push-button setting devices 26–33, inc. Mounted on the 24-hour sleeve 20 is a disk 41 having an axially extending arm 41a on which is supported a contact mechanism. As shown in Fig. 7, this contact mechanism comprises a slotted resilient plate 42 secured to the arm 41a, a spacer block 43 of insulation material and a second slotted resilient conductive plate 44. Each of the plates 42 and 44 is in the form of a comb, the plate 44 terminating in a series of contact teeth 44a the outer portions of which are bent radially inwardly and the plate 42 terminating in a series of follower teeth 42a the outer portions of which are bent radially outwardly. The teeth 42a are in alignment with the teeth 44a and are separated by a series of spacers 45 of insulation material. The contact teeth 44a are disposed individually to register with the several slip-rings 40 but are normally out of contact therewith. The plate 44 is also provided with a single contact brush 44b disposed to be permanently in contact with one of the slip-rings 40, specifically the right-hand ring as viewed in Fig. 2. The spacings between the successive slip-rings 40, the successive contact teeth 44a and the successive follower teeth 42a are equal to the increment of axial movement between the successive push-buttons 26–33, inc.

Each of the slider members 24 is formed with a radially inwardly projecting lug 24c which, in each position to which it is adjusted by one of the push-buttons 26–33, inc., is effective to register with one of the follower teeth 42a. In other words, since the disk 41 is rotated by the 24-hour shaft 20 of the timing mechanism, each of the contact teeth 44a is disposed to be actuated into engagement with its associated slip-ring 40 by each of the slider members 24 when set in a predetermined position which is different for each of the contact teeth 44a.

There is illustrated in Figs. 4, 5, 6 and 7 a circuit and switching apparatus suitable for control by the program-scheduling apparatus of the invention. Referring to Fig. 7, the clock motor 14 is connected directly to suitable supply terminals 70, which may be a conventional 60-cycle alternating-current domestic supply line. The clock motor 14, through the gearing mechanism previously described and represented schematically at 14a, rotates the disk 41 and the associated contact mechanism once each 24 hours. The clock motor 14 also rotates a switch 71 one revolution each 15 minutes, corresponding to the time interval between adjacent time sliders 24. As shown in Figs. 4, 5 and 6, the switch 71 comprises a rotating cam 71a of insulation material which successively engages two contact fingers 71b and 71c, in the order named, and disengages them in the same order. The fingers 71b and 71c carry cooperating contact elements 71d and have such a configuration that the contacts 71d are closed only during the interval when the contact finger 71c is raised by the cam 71a while the finger 71b is disengaged; that is, when neither or both of the contact fingers 71b, 71c are engaged by the cam 71a, the switch contacts are open.

The control circuit of the system includes in series the contacts 71d, a manually operable master switch 72, and the slip-ring 40 in permanent engagement with the contact finger 44b. The circuit is then continued during each interval of time through the particular one of the contact teeth 44a which is actuated into engagement with its associated slip-ring 40 by the engagement of one of the follower teeth 42a with the timing sliders 24. The several slip-rings 40 are individually connected by way of a series of conductors 73 and a group of control solenoids 74 in series with a tuning motor 75 and thence to the other side of the supply terminals 70. The tuning motor 75 is connected to tune a radio receiver 76 and simultaneously to control its energization by means of a switch 77 operated by a cam 78 driven by the tuning motor. In parallel with the several contact and slip-ring components described, there are provided a group of manually operable switches 79 individually connected in circuit with the several controlling solenoids 74.

In considering the operation of the program-scheduling apparatus described, it will be assumed that initially the cancelling ring 38 is moved to its extreme right-hand position, as seen in Fig. 2, thereby engaging all of the slider members 24 and moving them to their extreme right-hand or zero positions. The cancelling member 38 is then returned to its left-hand position, as illustrated in Fig. 2. If desired, this return of the cancelling member may be facilitated by biasing springs (not shown). Thereupon the operator may engage the recess in any of the push-buttons 26–33, inclusive, for example the push-button 26, and rotate it and the supporting frame 34 until the projection 26c registers with the slider member 24 corresponding to the desired time, for example 3:00 A. M., as shown in Fig. 1. The push-button 26 is then depressed to the limit of its movement, thereby moving the slider member corresponding to the time 3:00 A. M., the minimum distance so that its lug 24c lies in the plane of the first follower tooth 42a. Upon rotation of the disk 41 by the 24-hour sleeve 20, the lug 24c will engage the first follower tooth 42a to make contact between the first contact tooth 44a and its associated slip-ring 40. The same push-button 26 may then be released and rotated into any other angular position to set any one or more additional ones of the slider members 24, it being understood that with this arrangement the first follower tooth 42a will actuate its associated contact tooth 44a into contact with its respective slip-ring 40 for each one of the timing positions represented by the slider members 24 which have been set by the push-button 26. Similarly, each of the other push-buttons 27–33, inc., may be operated to adjust any one or more of the slider members 24, each push-button being effective to adjust any selected slider member 24 a different amount which is characteristic for each push-button. Therefore, each member 24 will engage only the corresponding one of the follower teeth 42a corresponding to the particular push-button and thus will make contact only between the corresponding one of the contact teeth 44a and its associated slip-ring 40. Thus, it is seen that the program-scheduling apparatus of the invention requires only a number of slider members 24 equal to the number of time intervals into which the total time period is divided, rather than the product of this number and the total number of control functions or stations which it is desired to accommodate. At the same time, there is provided a separate slider-setting push-button for each control function or controlled station and each is operable quickly and accurately to a single limiting position which is characteristic of and different for each of the push-buttons 26-33, inc. Therefore, each of the push-buttons 26-33, inc., may be quickly, readily and accurately operated to set any desired number of slider members 24 and an entire 24-hour program may be scheduled or set up accurately and in a minimum of time.

It is believed that the operation of the control system and apparatus of Figs. 4, 5, 6 and 7 will be clear from the foregoing description. In brief, upon the setting of any of the slider members 24 to a particular position by any selected one of the slider-setting devices 26-33, inc., the corresponding one of the follower teeth 42a is engaged, thereby to actuate the corresponding one of the contact teeth 44a into engagement with its respective slip-ring 40. The mechanical connections are such that, during this short interval of contact, the switch 71d is effective to close its contacts so that, with the master switch 72 closed, a circuit is completed through one of the control conductors 73 and the respective one of the control solenoids 74 to the tuning motor 75. The motor 75 then operates to tune the receiver 76 to the station corresponding to the particular one of the push-button devices 26-33, inc., which has been operated. Simultaneously the cam 78 is actuated to close the contacts 77 to energize the receiver 76. It will be understood that the control solenoids 74 may function in any conventional manner as, for example, by controlling a slip-clutch, stop, etc., associated with the tuning motor 75 to stop the adjustment of the tuning mechanism in the proper position of the tuning elements of the receiver 76. If the "off" push-button 32 is operated, the appropriate control solenoid 74 will be actuated to stop the tuning motor in the position illustrated in Fig. 7, so that the circuit of the receiver is interrupted at the contacts 77.

The mechanical connections between the clock motor 14, the switch 71 and the contact disk 41 are such that the switch contacts 71d are closed for a short interval, for example 10 seconds, commencing precisely on each hour and quarter hour so that the switch 71 constitutes precision tuning means for the program-controlling circuits. The engagement of any one of the contact teeth 44a with its associated slip-ring 40 is for a longer interval, preferably of five minutes or more, which includes the momentary closing period of the switch contacts 71d, so that the slip-rings 40 and their engaging contact fingers 44a controlled by the sliders 24 constitute the circuit-selecting or circuit-routing means. An operation takes place only when both the timing and routing circuit-controlling means are both closed. The time interval during which the contacts 71d are closed is made sufficient to enable the tuning motor 75 to actuate the tuning mechanism of the receiver 76 through one complete tuning cycle. The control solenoids 74 discontinue the tuning action of the motor 75 at the proper tuning position, although the motor 75 will continue to be energized during the interval that the switch 71 is closed and contact is completed at the slip-rings 40.

Referring now to Figs. 8, 9 and 10, there is represented a modified form of a program-scheduling apparatus embodying the invention. Certain of the elements of the modified form may be identical or nearly identical to those of the form of the invention illustrated in Figs. 1 and 2 and such elements are identified by corresponding reference numerals. In this form of the invention, the settable slider members are in the form of grooved U-shaped spring-metal stampings 50 and the means for movably supporting these slider members comprises a stationary disk-like frame 51 mounted behind the clock face 10 and having a rim 51a overlying the rim of the frame 22. The supporting frame 51 has a plurality of equally spaced radial spokes 51b for individually supporting the sliders 50 for radial movement thereof.

In the apparatus of Figs. 8 and 9 the slider-setting devices are in the form of Z-shaped sliders 52 corresponding in number to the number of control functions or stations to be covered and supported in an annular second supporting frame 53 having a channel-shaped cross-section and rotatably supported on a hub 51c secured to the supporting frame 51. The supporting frame 53 has a plurality of radial slots 53a-53h, inc., of progressively increasing depths measured from its axis and corresponding in number to the number of control functions or stations to be covered. The supporting frame 53 is also provided with a plurality of apertures 53i-53p, inc., in the outer flange thereof radially in alignment with the slots 53a-53h, inc. The slider devices 52 are disposed in the slots 53i-53p, inc., as shown in Fig. 9 and are provided with projecting lugs or pins 52a engaging the slots 53a-53h, inc., and with projecting lugs 52b effective to engage and move any slider member 50 in registry therewith. Each of the slider-setting members 52 is provided with a recessed portion 52c and a resilient band or cord 54 is threaded around these portions to bias the several slider-setting members 52 to return to their innermost or zero positions.

In the apparatus of Figs. 8 and 9, the several conductive slip-rings 55 are spaced concentrically rather than axially and supported from a stationary annular disk 56 of insulation material. Similarly, the timing mechanism movable to engage the sliders 50 in succession and responsive to the respective positions thereof in this case comprises a disk 57 secured to the 24-hour sleeve 20 and having mounted thereon a follower-tooth and contact-tooth assembly which may be identical to that embodied in the apparatus of Figs. 1 and 2 and illustrated in Fig. 7.

The principles of operation of the program-scheduling apparatus of Figs. 8 and 9 are entirely similar to those of the apparatus of Figs. 1 and 2 described above. In brief, in order to set the apparatus to tune to any given station at any given time, it is only necessary to grasp any of the slider-setting devices 52 and rotate its supporting frame 53 until the particular device 52 is in radial registry with any desired timing slider 50. Thereupon the setting device 52 is moved radially outwardly to its limiting position as determined by the depth of the particular slot 53a–53h, inc., in which it is mounted. Such movement will then adjust the slider member 50 radially outwardly to such a position that it registers with the particular one of the follower teeth 42a effective to connect its associated contact tooth 44a with the slip-ring 55 corresponding to the particular function or station to be controlled. Upon release of the particular slider-setting device 52, the resilent cord 54 is effective to return it to its zero or radially innermost position. The operation of the timing mechanism comprising the disk 57, the follower teeth 42a, contact teeth 44a and slip-rings 55 is entirely similar to that described above in connection with Figs. 1 and 2 and the slip-rings 55 may be connected in the circuit of Fig. 7, described above, or in any other suitable control system.

Referring now to Figs. 11 and 12 of the drawings, there is illustrated a modified form of a program-scheduling apparatus of the invention disposed in a generally rectangular housing 60 having a pair of longitudinally extending supporting brackets or slides 60a secured thereto, in the central portion of which is mounted a timing mechanism including a clock face 10. In this instance, there are provided two groups of elongated timing sliders 61 and 62 disposed on opposite sides of the slides 60a. The frame 60 includes provisions for supporting these sliders for longitudinal movement and in parallel planar relation, for example a series of parallel longitudinal slots 60b above the slides 60a and a second similar series of parallel longitudinal slots 60c below the slides 60a, the group of sliders 61 being supported in slots 60b with lugs 61a extending therethrough and the group of sliders 62 being supported for longitudinal movement in the slots 60c with lugs 62a extending therethrough.

The apparatus of Figs. 11 and 12 also includes a second frame 63 parallel to the first frame and movable longitudinally along the slides 60a transversely of the sliders 61 and 62. Disposed in the frame 63 is a group of slider-setting devices 64, 65, 66, 67, 68 and 69. Each of these devices, for example the device 69 of Fig. 11, comprises an operating knob 69a attached to a longitudinal slider 69b having a pin 69c projecting through one of a series of parallel slots 63a–63f, inc., arranged in the front cover of the frame 63 and spaced in the direction of its longitudinal movement. The slots 63a–63f, inc., and their associated slider-setting devices 64–69, inc., correspond in number to the number of functions or stations to be controlled. As shown in Fig. 11, the slots 63a–63f, inc., are of progressively increasing lengths and extend symmetrically above and below the centerline of the frame 63.

The apparatus of Figs. 11 and 12 also includes a carriage 80 which is movable back and forth within the frame 60 by a lead-screw 81 operated by gearing 81a from the clock motor 14 and including provisions for automatically reversing it at the end of its travel in either direction, for example a double reverse thread with a reversing loop at each end. The carriage 80 is provided with a plurality of contact jumpers 82 provided with contacts 82a disposed selectively to engage contacts 61a, 62a disposed on the sliders 61 and with contacts 82b contacting a series of longitudinal bus bars 83 disposed in the frame.

The general principle of operation of the program-scheduling apparatus of Figs. 11 and 12 is similar to that of the forms described above. In brief, the frame 63 may be moved longitudinally along the slides 60a until a given slider-setting device, for example the device 68, is in registry with a particular timing slider member 61 or 62. The knob 68a may then be operated either upwardly, in the case of an A.M. time-setting, or downwardly as illustrated in Fig. 11 in the case of a P. M. time-setting, to move the timing slider in registry therewith. The extent of movement of the slider-setting member 68 is determined by the length of its respective slot 63e and the movement of each of the slider-setting devices 64–69, inc., is correspondingly different so that each slider-setting device is effective to set any of the sliders 61 or 62 to a particular position corresponding to the particular function to be controlled.

Any suitable timing mechanism and control circuit may be provided to cooperate with and respond to the positions of the several timing sliders 61 and 62 set up as described above. By way of example, however, there is represented in Fig. 13 the application of the timing system of Fig. 7 to the apparatus of Figs. 11 and 12, corresponding elements of Figs. 7 and 13 being identified by the same reference numerals. Since the circuit arrangement of Fig. 13 is identical to that of Fig. 7, its general operation is that described above in connection with Fig. 7. It will be apparent from the foregoing description that the clock motor 14 actuates the lead-screw 81 continuously to reciprocate the carriage 80 back and forth within the frame 60, the groups of contacts 82a making contact with selected ones of the slider contacts 61a, 62a in accordance with the setting of such sliders by the carriage 63, as described above. Upon making connection between any of the contacts 82a and the contacts 61a, 62a, such selected contact 61a or 62a is connected to the one of the bus bars 83 to which the particular contact 82a is connected and, through the bus bar 83, makes connection with the appropriate control solenoid 74 of the receiver 76. In this way, a complete time function program may be readily set up to cover the entire 24-hour period by appropriate actuation of the slider-setting devices 64–69, inc., each cooperating with any selected ones of the time sliders 61, 62.

While there have been described what are at present considered to be the preferred embodiments of the invention, it will be apparent to those skilled in the art that various changes and modifications may be made therein without departing from the spirit or scope of the invention.

What is claimed as new is:

1. A program apparatus for setting up a predetermined schedule of a plurality of functions within a given time period comprising, a group of settable members, means for movably supporting said members, a group of member-setting devices, one of said groups corresponding in number to the number of time intervals in said time period and the other group corresponding in number to the number of functions, means for establishing an operative connection between each of said devices and any of said members to set the same, each of said devices having a different characteristic movement for moving an operatively connected member a different amount, and means responsive to the position of said members for determining the desired function-time interval.

2. A program apparatus for setting up a predetermined schedule of a plurality of functions within a given time period comprising, a group of settable sliders, means for movably supporting said sliders, a group of slider-setting devices, one of said groups corresponding in number to the number of time intervals in said time period and the other group corresponding in number to the number of functions, means for establishing an operative connection between each of said devices and any of said sliders to set the same, each of said devices having a different characteristic movement for moving an operatively connected slider a different amount, and means responsive to the position of said sliders for determining the desired function-time intervals.

3. A program apparatus for setting up a predetermined schedule of a plurality of functions within a given time period comprising, a group of settable sliders equally spaced along an arcuate path, means for movably supporting said sliders, a group of slider-setting devices arranged along an arcuate path coaxial with said first path, one of said groups corresponding in number to the number of time intervals in said time period and the other group corresponding in number to the number of functions, means for supporting said devices for movement to set a slider in registry therewith, said two supporting means being relatively rotatable to bring each device into registry with any of said sliders to set the same, each of said devices having a different characteristic movement for moving a registering slider a different amount, and means responsive to the positions of said sliders for determining the desired function-time interval.

4. A program apparatus for setting up a predetermined schedule of a plurality of functions within a given time period comprising, a group of elongated settable sliders, means for supporting said sliders for longitudinal movement thereof, a group of slider-setting devices, one of said groups corresponding in number to the number of time intervals in said time period and the other group corresponding in number to the number of functions, means for establishing an operative connection between each of said devices and any of said sliders to set the same, each of said devices having a different characteristic movement for moving an operatively connected slider a different amount, and means responsive to the positions of said sliders for determining the desired function-time interval.

5. A program apparatus for setting up a predetermined schedule of a plurality of functions within a given time period comprising, a group of settable sliders, means for movably supporting said sliders, a group of manually operable slider-setting devices, one of said groups corresponding in number to the number of time intervals in said time period and the other group corresponding in number to the number of functions, means for supporting said devices for movement to set a slider in registry therewith, means for normally biasing said devices out of engagement with said sliders, said two supporting means being relatively movable to bring each device into registry with any of said sliders to set the same, each of said devices having a different characteristic movement for moving a registering slider a different amount, and means responsive to the positions of said sliders for determining the desired function-time interval.

6. A program apparatus for setting up a predetermined schedule of a plurality of functions within a given time period comprising, a group of settable sliders, means for movably supporting said sliders, a group of reciprocable push-buttons each including a portion disposed to engage a slider in registry therewith, one of said groups corresponding in number to the number of time intervals in said time period and the other group corresponding in number to the number of functions, means for establishing an operative connection between each of said push-buttons with any of said sliders to set the same, each of said push-buttons having a different characteristic movement for moving an operatively connected slider a different amount, and means responsive to the positions of said sliders for determining the desired function-time interval.

7. A program apparatus for setting up a predetermined schedule of a plurality of functions within a given time period comprising, a group of settable sliders, a group of slider-setting devices, one of said groups corresponding in number to the number of time intervals in said time period and the other group corresponding in number to the number of functions, a pair of coaxial relatively rotatable supporting frames, each having one of said groups movably mounted therein so as to bring each device into registry with any of said sliders to set the same, each of said devices having a different characteristic movement for moving a registering slider a different amount, and means responsive to the position of said sliders for determining the desired function-time intervals.

8. A program apparatus for setting up a predetermined schedule of a plurality of functions within a given time period comprising, a group of settable sliders, means for movably supporting said sliders, a group of slider-setting devices, one of said groups corresponding in number to the number of time intervals in said time period and the other group corresponding in number to the number of functions, means for establishing an operative connection between each of said devices and any of said sliders to set the same, each of said devices being movable a different distance for moving an operatively connected slider a different amount, and means responsive to the position of said sliders for determining the desired function-time intervals.

9. A program apparatus for setting up a predetermined schedule of a plurality of functions within a given time period comprising, a group of settable sliders, means for movably supporting said sliders, a group of slider-setting devices, one of said groups corresponding in number to the number of time intervals in said time period and the other group corresponding in number to the number of functions, means for establishing an operative connection between each of said devices and any of said sliders to set the same, stop means cooperating with each of said devices for limiting the movements thereof to different amounts, thereby to move an operatively connected slider a different amount, and means responsive to the position of said sliders for determining the desired function-time intervals.

10. A program apparatus for setting up a predetermined schedule of a plurality of functions within a given time period comprising, a group of settable sliders, means for movably supporting said sliders, a group of slider-setting devices, one of said groups corresponding in number to the number of time intervals in said time period and the other group corresponding in number to the number of functions, means for establishing an operative connection between each of said devices and any of said sliders to set the same, each of said devices having a different characteristic movement for moving an operatively connected slider a different amount, a plurality of relatively rotatable electrical slip-rings and contact fingers individual thereto, each of said fingers being disposed to be actuated into engagement with its associated slip-ring by each of said sliders when moved to a predetermined position which is different for each of said fingers, and function-time interval control circuits individually connected to said slip-rings.

11. A program apparatus for setting up a predetermined schedule of a plurality of functions within a given time period comprising, a group of elongated settable sliders, a first frame including opposed end plates supporting said sliders for longitudinal movement thereof, said sliders being disposed substantially in a cylindrical array, a group of slider-setting devices, one of said groups corresponding in number to the number of time intervals in said time period and the other group corresponding in number to the number of functions, a second frame coaxial with said first frame and supporting said devices for movement to set a slider in registry therewith, said two supporting frames being relatively rotatable to bring each device into registry with any of said sliders to set the same, each of said devices having a different characteristic movement for moving a registering slider a different amount, and means responsive to the position of said sliders for determining the desired function-time intervals.

12. A program apparatus for setting up a predetermined schedule of a plurality of functions within a given time period comprising, a group of settable sliders, a first frame including a plurality of radial spokes for individually supporting said sliders for radial movement thereof, a group of slider-setting devices, one of said groups corresponding in number to the number of time intervals in said time period and the other group corresponding in number to the number of functions, a second frame coaxial with said first frame and supporting said devices for movement to set a slider in registry therewith, said two supporting frames being relatively rotatable to bring each device into registry with any of said sliders to set the same, each of said devices having a different characteristic movement for moving a registering slider a different amount, and means responsive to the position of said sliders for determining the desired function-time intervals.

13. A program apparatus for setting up a predetermined schedule of a plurality of functions within a given time period comprising, a group of settable sliders, a first frame including provisions for supporting said sliders for longitudinal movement and in parallel planar relation, a group of slider-setting devices, one of said groups corresponding in number to the number of time intervals in said time period and the other group corresponding in number to the number of functions, a second frame parallel to said first frame and supporting said devices for movement to set a slider in registry therewith, said two supporting frames being relatively movable transversely of said sliders to bring each device into registry with any of said sliders to set the same, each of said devices having a different characteristic movement for moving a registering slider a different amount, and means responsive to the position of said sliders for determining the desired function-time intervals.

14. A program apparatus for setting up a predetermined schedule of a plurality of functions within a given time period comprising, a group of settable timing sliders, means for movably supporting said sliders, a group of function-slider-setting devices, means for establishing an operative connection between each of said devices and any of said sliders to set the same, each of said devices having a different characteristic movement for moving an operatively connected slider a different amount, and means responsive to the positions of said sliders for determining the desired function-time intervals.

15. A program apparatus for setting up a predetermined schedule of a plurality of functions within a given time period comprising, a group of settable timing sliders, means for movably supporting said sliders, a group of function slider-setting devices, means for establishing an operative connection between each of said devices and any of said sliders to set the same, each of said devices having a different characteristic movement for moving an operatively connected slider a different amount, and timing mechanism movable to engage said sliders in succession and responsive to the respective positions thereof for determining the desired function-time intervals.

16. A program apparatus for setting up a predetermined schedule of a plurality of functions within a given time period comprising, a group of settable timing sliders, means for movably supporting said sliders, a group of function slider-setting devices, means for establishing an operative connection between each of said devices and any of said sliders to set the same, each of said devices having a different characteristic movement for moving an operatively connected slider a different amount, a plurality of electrical slip-rings, a plurality of contact fingers individual to said slip-rings but normally out of contact therewith, timing mechanism for rotating said fingers, each of said fingers being disposed to be actuated into engagement with its associated slip-ring by each of said sliders when moved to a predetermined position which is different for each of said fingers, and function control circuits individually connected to said slip-rings for determining the desired function-time intervals.

HAROLD F. ELLIOTT.

Disclaimer 2,410,724.—*Harold F. Elliott*, Belmont, Mass. PROGRAM-SCHEDULING APPARATUS.
Patent dated Nov. 5, 1946. Disclaimer filed July 26, 1949, by the inventor.
Hereby enters this disclaimer to claims 1, 2, 4, 5, 6, 8, 9, 14, and 15 of said patent.
[*Official Gazette Aug. 30, 1949.*]